United States Patent
Arakawa et al.

(10) Patent No.: US 8,529,401 B2
(45) Date of Patent: Sep. 10, 2013

(54) CONTROL DEVICE FOR DRIVE MOTORS

(75) Inventors: Kazuya Arakawa, Fujinomiya (JP); Kensuke Yoshizue, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/641,784

(22) PCT Filed: Apr. 23, 2010

(86) PCT No.: PCT/JP2010/057213
§ 371 (c)(1),
(2), (4) Date: Oct. 17, 2012

(87) PCT Pub. No.: WO2011/132304
PCT Pub. Date: Oct. 27, 2011

(65) Prior Publication Data
US 2013/0035203 A1 Feb. 7, 2013

(51) Int. Cl.
*H02P 15/00* (2006.01)

(52) U.S. Cl.
USPC .................................................. 477/8; 477/83

(58) Field of Classification Search
USPC ....... 477/1, 3, 5, 7, 8, 15, 70, 83, 85; 701/53, 701/54; 180/253, 65.1
See application file for complete search history.

(56) References Cited

U.S. PATENT DOCUMENTS

| 5,481,460 A | 1/1996 | Masaki et al. | |
|---|---|---|---|
| 2008/0004780 A1* | 1/2008 | Watanabe et al. | 701/54 |
| 2010/0025131 A1* | 2/2010 | Gloceri et al. | 180/65.28 |

FOREIGN PATENT DOCUMENTS

| JP | 4 145810 | 5/1992 |
|---|---|---|
| JP | 6 153325 | 5/1994 |
| JP | 2009 142036 | 6/2009 |

OTHER PUBLICATIONS

International Search Report Issued Jul. 20, 2010 in PCT/JP10/57213 Filed Apr. 23, 2010.

* cited by examiner

*Primary Examiner* — Justin Holmes
(74) *Attorney, Agent, or Firm* — Oblon, Spivak, McClelland, Maier & Neustadt, L.L.P.

(57) ABSTRACT

A control system for driving motor configured to synchronize rotor phases of a plurality of driving motors of wheels using a single inverter. The control system comprises driving motor connected with a wheel to drive the wheel; a clutch interposed between the driving motor and the wheel; and a current control means connected with the driving motor to supply current thereto. A switching unit switches electrical connection in a manner to supply the current to both of the driving motors from one of the current control unit by interrupting the current supply from the other current control unit. The clutch interrupts torque transmission in case the switching mechanism switches the electrical connection in a manner to supply the current to both of the driving motors from one of the current control unit to drive the vehicle.

9 Claims, 6 Drawing Sheets

CONTROL DEVICE FOR DRIVE MOTORS

TECHNICAL FIELD

This invention relates, in general, to a control system for controlling a driving motor of a vehicle, and more particularly, to a control system for a plurality of synchronous motors connected with each wheel of a vehicle.

BACKGROUND ART

Driving motors have been used as a prime mover not only in an electric vehicle but also in a hybrid vehicle using both an internal combustion engine and an electric motor. In the electric vehicle, the driving motors are arranged to drive each front wheel or each rear wheel. Alternatively, the driving motors may also be arranged to drive all wheels. Thus, in those kinds of vehicles, the driving motors are provided to drive the right wheel and the left wheel individually. Therefore, if one of those driving motors is in trouble, or if one of electric current sources is in trouble, the driving force of the right and the left wheels lose their balance.

Japanese Patent Laid-Open No. 4-145810 discloses an electric motor vehicle comprising electric motors for driving right and left wheels, and inverters for feeding electric current to those motors. According to the teachings of Japanese Patent Laid-Open No. 4-145810, in case a failure occurs in one of the inverters, a current supply from the troubled inverter is interrupted, and the other inverter supplies the current to both right and left wheels to drive those wheels. According to another embodiment of Japanese Patent Laid-Open No. 4-145810, a clutch is individually interposed between each motor and wheel. According to this embodiment, in case a failure occurs in one of the inverters, a current supply from the troubled inverter is interrupted while disengaging the clutch attached to the motor connected with the troubled inverter.

Japanese Patent Laid-Open No. 2009-142036 discloses another example of the electric vehicle having motors for driving each of the front and rear wheels. In order to reduce drag loss of the motors to be rotated in case of driving only one of the pairs of front and rear wheels, according to the electric vehicle taught by Japanese Patent Laid-Open No. 2009-142036, a one-way clutch adapted to transmit the power only in one rotational direction is individually interposed between each motor and wheel.

According to the electric motor vehicle taught by Japanese Patent Laid-Open No. 4-145810, even in case a failure occurs in one of the inverters for feeding the current to the driving motor, both of the right and the left motors can be driven by supplying the current thereto from the other inverter while stopping a current supply from the troubled inverter. Under the normal condition, those motors are driven individually by the currents of different phases outputted from different inverters. However, provided that both of the right and the left motors are synchronous motors, those motors may be driven out of phase if those motors are thus driven individually by the currents of different phases. Therefore, if those motors thus rotated out of phase are driven together by the common current outputted from the one of the inverters when the other inverter is in trouble, a torque balance between the right and the left wheel may be lost.

DISCLOSURE OF THE INVENTION

The present invention has been conceived noting the technical problems thus far described, and its object is to provide a control system for driving motor, which is configured to synchronize rotor phases of a plurality of driving motors of wheels using a single inverter.

In order to achieve the above-mentioned object, the control system for a driving motor according to the present invention comprises: at least two driving motors individually connected with a wheel of a vehicle to drive the wheel; a clutch, which is interposed between each driving motors and the wheels to transmit a torque of the driving motor selectively to the wheel; at least two current control means connected individually with the driving motors to supply current thereto; and a switching means that switches an electrical connection in a manner to supply the current to both of the driving motors from one of the current control means by interrupting the current supply from the other current control means. According to the present invention, the clutch is adapted to interrupt torque transmission in case the switching mechanism switches the electrical connection in a manner to supply the current to both of the driving motors from one of the current control means to drive the vehicle.

Specifically, the clutch interrupts the torque transmission in case of synchronizing a rotor phase of the driving motors under the situation in which the switching means switches the electrical connection in a manner to supply the current to both of the driving motors from said one of the current control means.

In case the driving motors are demanded to output torques of different amplitude under the situation in which the switching means switches the electrical connection in a manner to supply the current to both of the driving motors from said one of the current control means, the clutch transmitting the smaller torque interrupts the torque transmission to the wheel.

According to the present invention, the clutch includes a one-way clutch that transmits the torque only in one direction.

Thus, according to the present invention, the control system is provided with at least two driving motors individually connected with a wheel of a vehicle to drive the wheel, and those driving motors are controlled by the current control means connected individually therewith. Therefore, each of the wheels can be driven independently. In addition, the control system is provided with the switching means that allows one of the current control means to supply the current to both of the driving motors. Therefore, for example, in case a performance of the other current control means is degraded, the current can be supplied to both of the driving motors without using the other current control means. Further, in case of driving the vehicle by thus supplying the current to both of the driving motors from one of the current control means, the clutch interposed between one of the driving motor and the wheel connected therewith interrupts torque transmission to the wheel. Therefore, a torque difference between the wheels can be reduced. For this reason, the vehicle is allowed to drive stably even in case of supplying the current to both of the driving motors from one of the current control means.

Specifically, the clutch interrupts the torque transmission in case of synchronizing the rotor phase of the driving motors under the situation in which the current is being supplied to both of the driving motors from one of the current control means. Therefore, the torque for adjusting the rotor phase will not be transmitted to the wheel. For this reason, the rotor phase of the driving motors can be synchronized without deteriorating the running stability of the vehicle.

In case the driving motors are required to output different torques under the situation in which the current is being supplied to both of the driving motors from one of the current control means, the clutch transmitting the smaller torque interrupts the torque transmission to the wheel. Therefore, even if the driving motors are required to output different torques, a torque balance between the wheels can be adjusted.

As described, according to the present invention, the clutch includes a one-way clutch that transmits the torque only in one direction. Therefore, even in case the driving motor outputs a negative torque, the negative torque will not be transmitted to the wheel so that the above-explained advantages can be achieved. In addition to the above-explained advantages, a structure of the clutch mechanism can be simplified.

BEST MODE FOR CARRYING OUT THE INVENTION

Next, the present invention will be explained in more detail. The present invention is applied to an automobile having in-wheel motors arranged individually in right and left wheels. For example, the control system of the present invention can be applied not only to a vehicle in which one of the pairs of front and right wheels are driven by the in-wheel motors and the other pairs of wheels are driven by an engine or rotated freely, but also to a vehicle in which all of the wheels are driven by the in-wheel motors. In those kinds of vehicles, a high-efficiency motor is required. Therefore, a permanent magnet synchronous motor is basically used in those kinds of vehicles. Specifically, such permanent magnet synchronous motor comprises a rotor having permanent magnets, and a stator having coils that individually generate a magnetic field when the current is supplied thereto. In case of driving the vehicle, the current is supplied to the coil based on a phase of the rotor in a manner to allow the motor to output maximum torque. For this purpose, the phase of the rotor is detected by a resolver arranged in the in-wheel motor.

Figure 2:
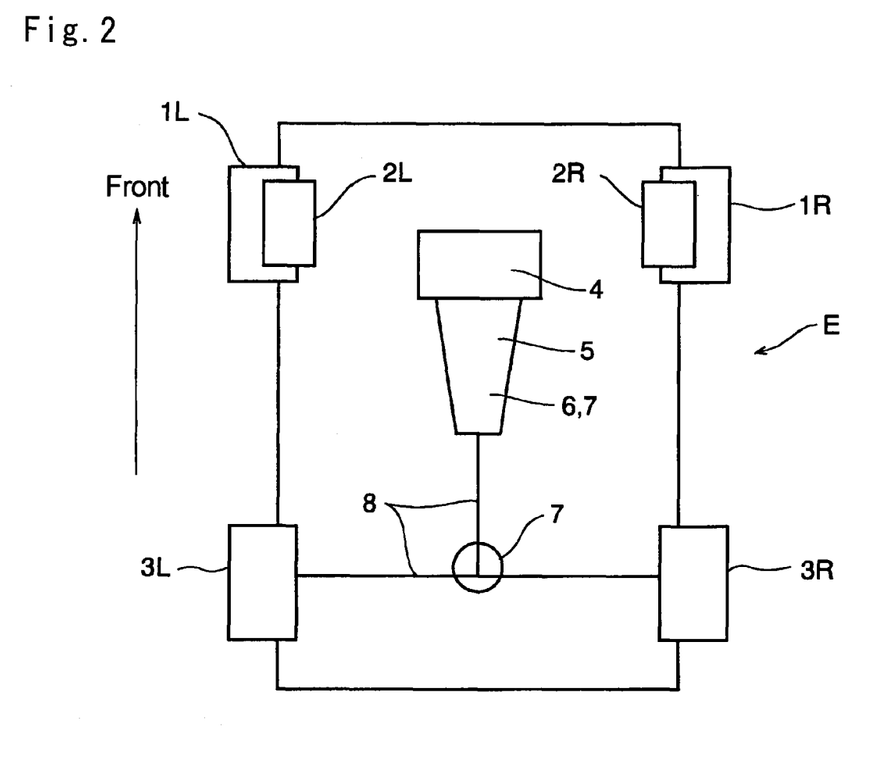
FIG. 2 is a view schematically showing the vehicle having driving motors to which the present invention is applied.

Here will be explained a vehicle E to which the present invention is applied in more detail with reference to accompanying figures. FIG. 2 is a view schematically showing the vehicle E. As shown in FIG. 2, in order to drive a right front wheel 1R and a left front wheel 1L, the right front wheel 1R is connected with an in-wheel motor 2R, and the left front wheel 1L is connected with an in-wheel motor 2L. In this example, a right rear wheel 3R and a left rear wheel 3L are connected with an internal combustion engine 4 or a motor 5 connected with the engine 4 in tandem or in parallel. Therefore, power generated by the engine 4 or motor 5 is transmitted to those rear wheels 3R and 3L via a known power transmission unit comprising a transmission 6, a gear train 7 and a shaft 8.

Figure 1:
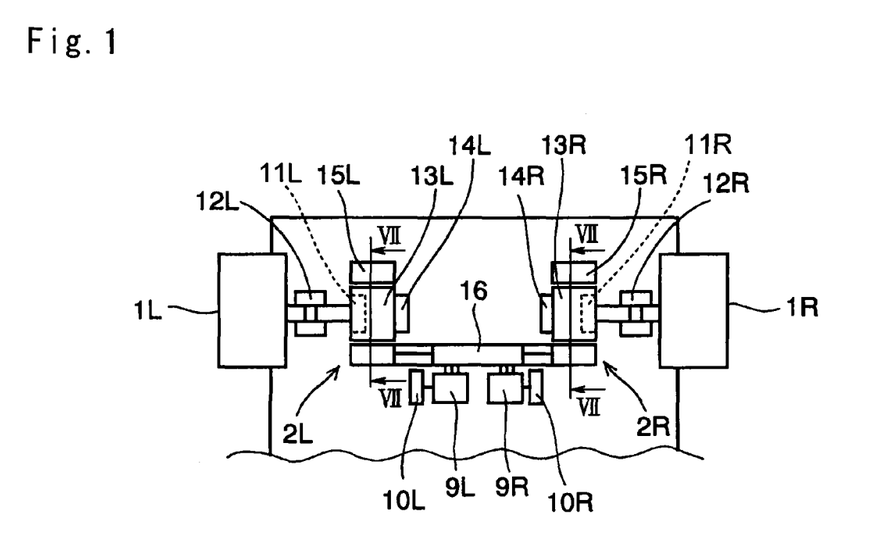
FIG. 1 is a view schematically showing the control system for driving motor according to the present invention.

FIG. 1 is a view schematically showing a control system for the in-wheel motors. As shown in FIG. 1, inverters 9R and 9L are electrically connected with the in-wheel motors 2R and 2L. In addition, a battery 10R is connected electrically with the inverter 9R, and a battery 10L is connected electrically with the inverter 9L. Therefore, required current to drive the in-wheel motors 2R and 2L can be supplied thereto from the batteries 10R and 10L through the inverters 9R and 9L.

A speed reducer 11R is interposed between the in-wheel motor 2R and the front wheel 1R, and a speed reducer 11L is interposed between the in-wheel motor 2L and the front wheel 1L. In addition, a one-way clutch 12R is interposed between the speed reducer 11R and the front wheel 1R, and a one-way clutch 12L is interposed between the speed reducer 11L and the front wheel 1L. Those one-way clutches 12R and 12L are adapted to transmit the power to the front wheels 1R and 1L only when the in-wheel motors 2R and 2L output the power in the direction to drive the vehicle in the forward direction. That is, in case the in-wheel motor 2R or 2L is rotated in the direction to drive the vehicle E in the forward direction, the power generated by the in-wheel motor 2R or 2L is transmitted to the front wheel 1R or 1L. To the contrary, in case the in-wheel motor 2R or 2L is rotated in the opposite direction to drive the vehicle E in the backward direction, the power generated by the in-wheel motor 2R or 2L will not be transmitted to the front wheel 1R or 1L. In order to detect the phases of rotors 13R and 13L, the in-wheel motors 2R and 2L are provided individually with resolvers 14R and 14L.

In order to drive the front wheels 1R and 1L appropriately depending on the situations in which the vehicle E is travelling straight ahead, and in which the vehicle E is turning, it is necessary to control the speeds and the output torques of the in-wheel motors 2R and 2L according to need. For this purpose, a phase of the rotor 13R is detected by the resolver 14R, and a phase of the rotor 13L is detected by the resolver 14L. Then, the current is applied to stators 15R and 15L from the batteries 10R and 10L through the inverters 9R and 9L in accordance with the detected phases of the rotors 13R and 13L and a required driving condition. Therefore, the rotors 13R and 13L are individually allowed to output the required torque.

Figure 3:
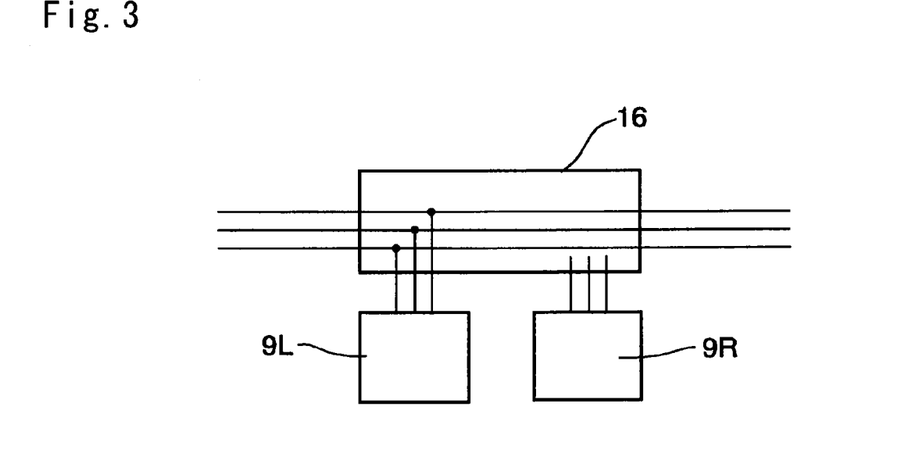
FIG. 3 is a view schematically showing the switching device of the control system.

In order to supply the current to both of the rotors 13R and 13L from one of the inverters 9R and 9L for various purposes, e.g., for protecting the inverters 9R and 9L, a switching device 13 is interposed between the inverters 9R and 9L and the in-wheel motors 2R and 2L. For example, in case an excessive current is applied to the inverter 9R, or in case the inverter 9R is overheated and the performance thereof is degraded, the inverter 9R is halted and electrically disconnected as illustrated in FIG. 3. In this situation, the other inverter 9L is connected with both of the in-wheel motors 2R and 2L to supply current thereto. Although the example of supplying the current to the in-wheel motors 2R and 2L from the left inverter 9L has been explained, it is also possible to supply the current to both of the in-wheel motors 2R and 2L from the right inverter 9R.

However, in case of supplying the current to both of in-wheel motors 2R and 2L from only one of the inverters 9R and 9L, magnetic fields of same magnetic force are generated at same circumferential positions in both stators 15R and 15L. In this situation, if the rotors 13R and 13L are out of phase, torques of the front wheels 1R and 1L lose their balance. In order to avoid such disadvantage, phases of rotors 13R and 13L have to be synchronized with each other especially in case of running straight ahead. Therefore, the control system of the present invention is configured to synchronize the phases of rotors 13R and 13L if those rotors 13R and 13L are being rotated out of phase, under the situation in that the switching device 13 switches the electrical connection in a manner to supply the current to both of the in-wheel motors 2R and 2L from one of the inverters 9R and 9L.

As described, the one-way clutch 12R is arranged between the in-wheel motor 2R and the front wheel 1R, and the one-way clutch 12L is arranged between the in-wheel motor 2L and the front wheel 1L. Therefore, the control system of the present invention is configured to synchronize the phases of the in-wheel motors 2R and 2L by applying the current to the stator 15R (or 15L) in a manner to output the torque from the in-wheel motor 2R (or 2L) in the direction opposite to drive the vehicle E in the forward direction.

Figure 4:
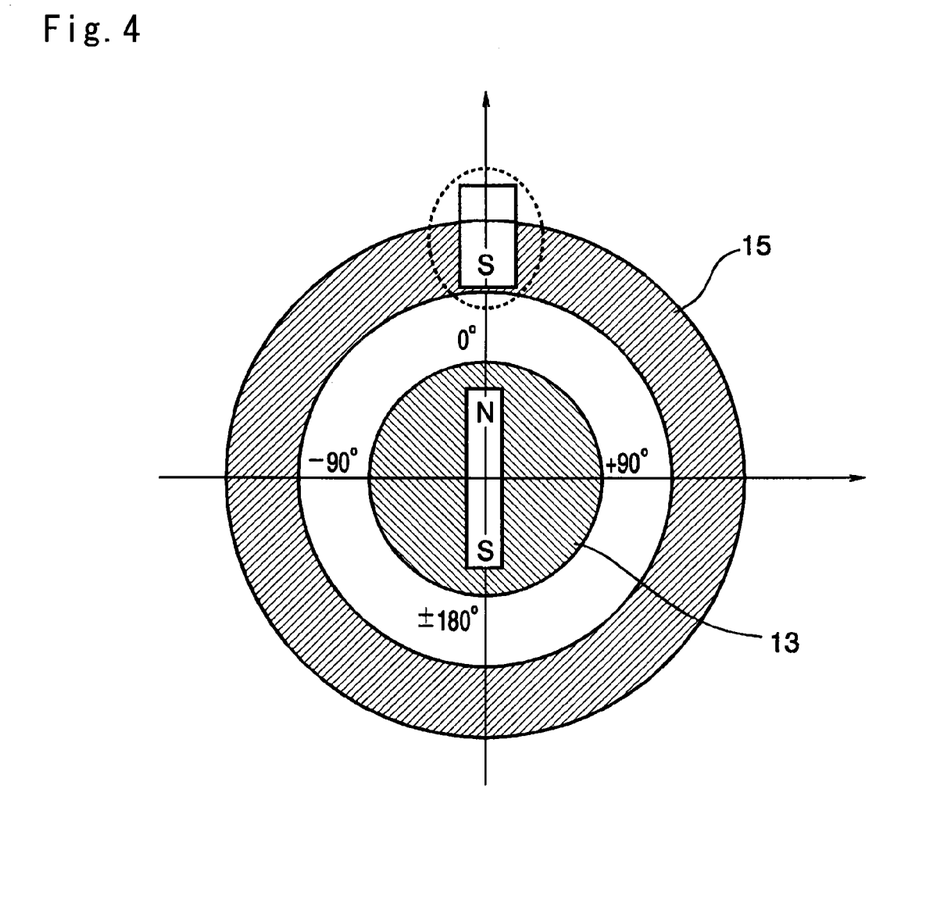
FIG. 4 is a sectional view showing a cross-section of the in-wheel motor.
Figure 5:
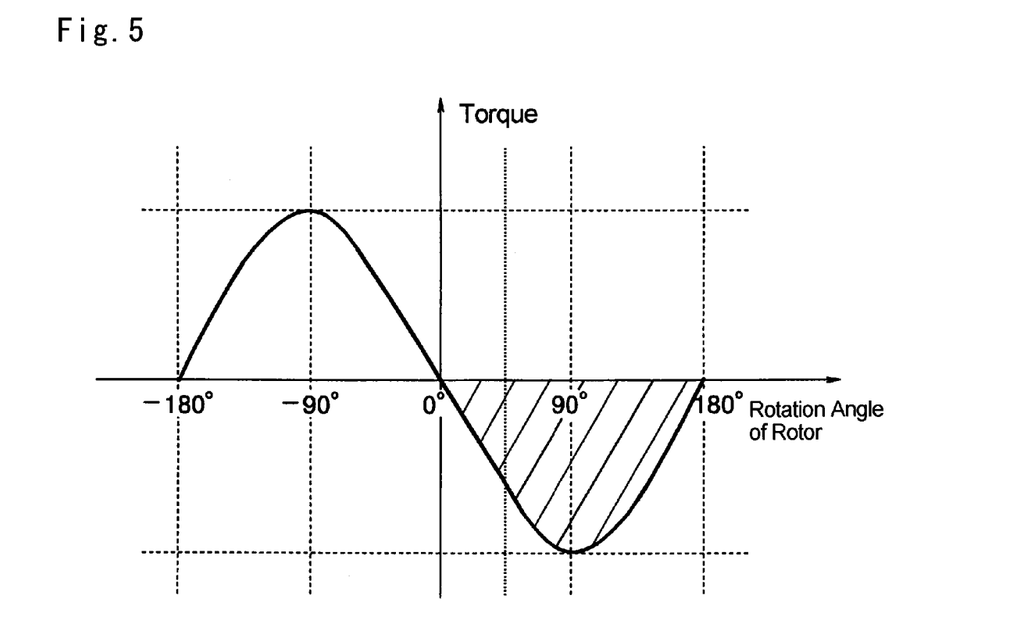
FIG. 5 is a graph indicating the amplitude and direction of the output torque of the rotor changing depending on the rotation angle of the magnetic poles of the rotor with respect to the magnetic field established in the stator.
Figure 6:
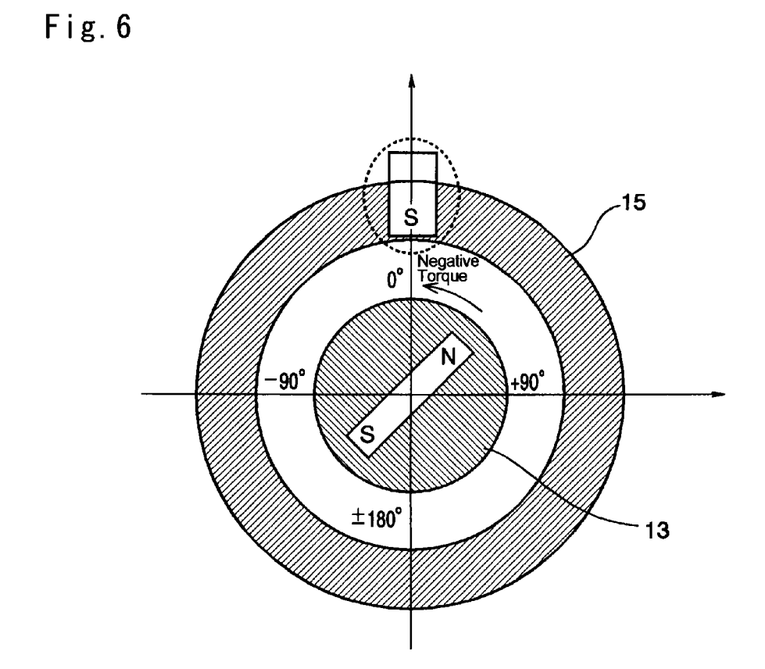
FIG. 6 is a sectional view showing a situation in which the north pole of the rotor is turned with respect to the south pole of the magnetic field established in the stator.

Here will be explained an amplitude and a direction of the torque generated by the rotor 13. The amplitude and the direction of the torque generated by the rotor 13 are changed depending on a relation between a position of the rotor 13 and a position of the magnetic field generated in the stator 15. FIG. 4 is a cross-sectional view showing a cross-section of the in-wheel motor 2, and only one pair of magnetic poles in the rotor 13 is illustrated in FIG. 4 for the sake of convenience. According to the example shown in FIG. 4, the in-wheel motor 2 outputs a positive torque to drive the vehicle E in the forward direction by rotating the rotor 13 in the clockwise direction, and outputs a negative torque by rotating the rotor 13 in the anticlockwise direction. In the example shown in FIG. 4, a south pole of the magnetic field established in the stator 15 is situated above a north pole of the rotor 13. In this situation, the output torque of the in-wheel motor 2 becomes 0 (zero) in case the north pole of the rotor 13 is situated just under the south pole of the stator 15, and in case the north pole of the rotor 13 is turned 180 degrees. In this situation, in case the north pole of the rotor 13 is turned to the right, the in-wheel motor 2 outputs the maximum negative torque, and to the contrary, in case the north pole of the rotor 13 is turned to the left, the in-wheel motor 2 outputs the maximum positive torque. Thus, the amplitude and the direction of the output torque of the in-wheel motor 2 are changed depending on the rotational angle of the rotor 13 and the position of the magnetic field established in the stator 15. FIG. 5 is a graph indicating the amplitude and direction of the output torque of the rotor 13 changing depending on the rotation angle of the magnetic poles of the rotor 13 with respect to the magnetic field established in the stator 15. As indicated in FIG. 5, the in-wheel motor 2 outputs a negative torque under the condition in which the north pole of the rotor 13 is situated within a range of the rotational angle between 0 degree and 180 degrees clockwise. Provided that the vehicle E is running in the forward direction, for example, the in-wheel motor 2 outputs the negative torque under the situation in which the north pole of the rotor 13 is turned 45 degrees clockwise with respect to the south pole of the magnetic field established in the stator 15, as shown in FIG. 6. As described, the one-way clutch 12 is interposed between the in-wheel motor 2 and the front wheel 1. In this situation, therefore, the power will not be transmitted to the front wheel 1, and the rotor 13 is rotated backwardly to the initial position of zero degree. Consequently, the vehicle E coasts temporarily or only the rear wheels 3R and 3L are driven temporarily in this situation. However, such control is completed extremely in short time. Therefore, the rotational angle of the rotor 13 can be adjusted without stopping the running vehicle E.

Figure 7:
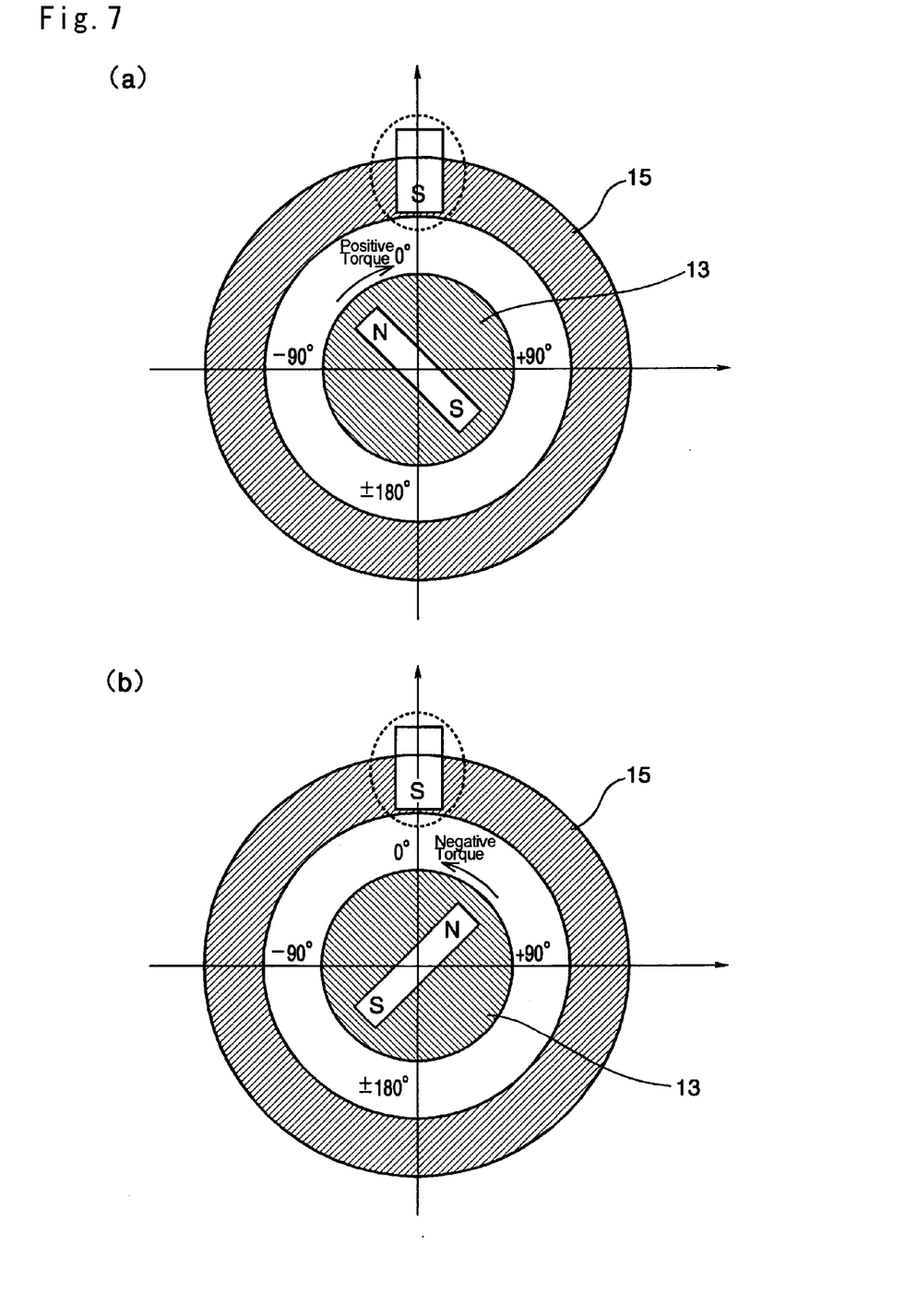
FIG. 7 is a sectional view showing a cross-section of the in-wheel motor along VII-VII line viewed from the direction indicated by the arrows.
Figure 8:
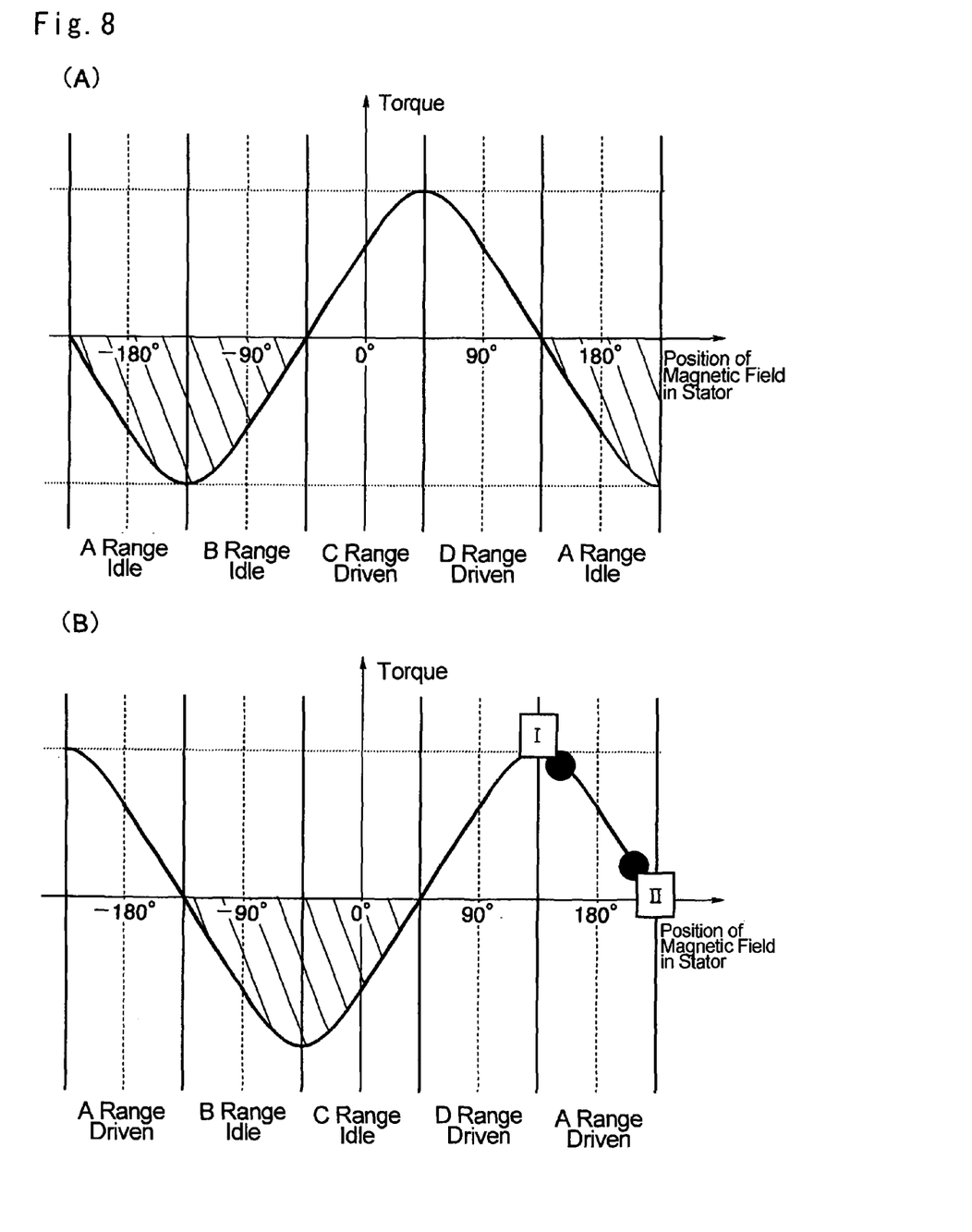
FIG. 8 is a graph indicating the amplitude and direction of the output torque of the in-wheel motor changing depending on a relation between the rotation angle of the rotor and the position of the magnetic field in the stator.

The control for synchronizing the in-wheel motors 2R and 2L under the situation in which the vehicle E is running in the forward direction will be explained in more detail. FIG. 7(a) is a sectional view showing a cross-section of the right in-wheel motor 2R along VII-VII line viewed from the direction indicated by the arrows, and FIG. 7(b) is a sectional view showing a cross-section of the left in-wheel motor 2L along VII-VII line viewed from the direction indicated by the arrows. In FIGS. 7(a) and 7(b), the point of zero degree is an initial point, and the in-wheel motor 2 outputs the positive torque by rotating the rotor 13 clockwise. In case the rotor 13R of the in-wheel motor 2R and the rotor 13L of the in-wheel motor 2L are rotated out of phase, the magnetic field is generated in each of the stators 15R and 15L within the region where the in-wheel motors 2R and 2L output the negative torque. As described, the one-way clutch 12R is interposed between the in-wheel motor 2R and the front wheel 1R, and the one-way clutch 12L is interposed between the in-wheel motor 2L and the front wheel 1L. Therefore, the phases of the rotor 13R and the rotor 13L can be synchronized with each other without transmitting the negative torque to the front wheels 1R and 1L. For example, in case the rotation angle of the north pole of the rotor 13R is −45 degrees as shown in FIG. 7(a), and the rotation angle of the north pole of the rotor 13L is +45 degrees as shown in FIG. 7(b), the magnetic field is shifted in both of the stators 15R and 15L in a manner to situate the south pole thereof within the range between −45 degrees and −135 degrees with respect to the initial position. FIG. 8(A) is a graph indicating the amplitude and direction of the output torque of the right in-wheel motor 2R changing depending on a relation between the position of the rotor 13R situated at the position shown in FIG. 7(a) and the position of the magnetic field established in the stator 15R. Likewise, FIG. 8(B) is a graph indicating the amplitude and direction of the output torque of the left in-wheel motor 2L changing depending on a relation between the position of the rotor 13L situated at the position shown in FIG. 7(b) and the position of the magnetic field established in the stator 15L. In case of thus generating the south poles in both of the stators 15R and 15L within the range between −45 degrees and −135 degrees, both of the in-wheel motors 2R and 2L generate the negative torques. In this situation, however, the one-way clutches 12R and 12L will not transmit the negative torque to the front wheels 1R and 1L. Therefore, the phases of the rotors 13R and 13L can be synchronized with each other. After thus synchronizing the phases of the rotors 13R and 13L, both of the in-wheel motors 2R and 2L are allowed to output the torques of same amplitudes in the same directions. As a result, running stability of the vehicle E can be improved.

Figure 9:
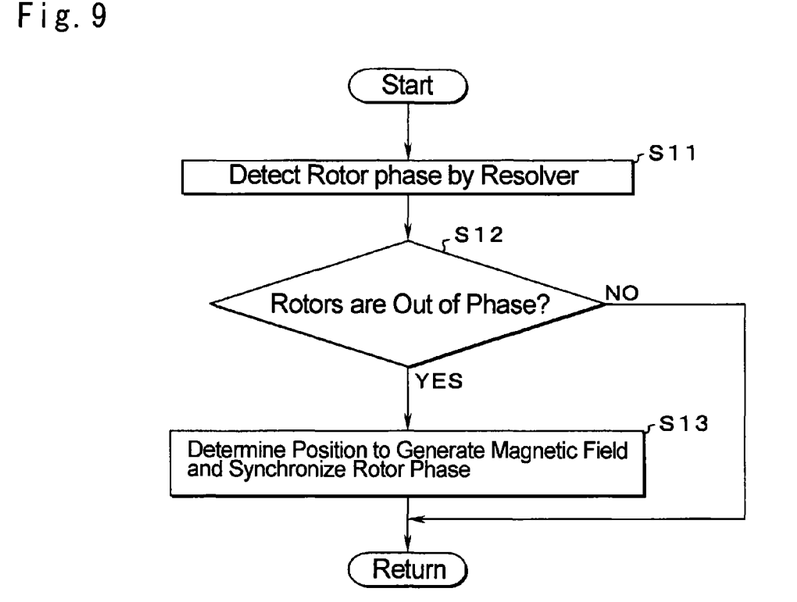
FIG. 9 is a flowchart explaining a control for the case in which the vehicle is running straight ahead.

FIG. 9 is a flowchart showing the above-explained control. First of all, phases of the rotors 13R and 13L of the in-wheel motors 2R and 2L are detected by the resolver 14R and 14L (at step S11). Then, it is judged whether or not the rotors 13R and 13L are rotated out of phase based on the detection result at step S11 (at step S12). In case the answer of step S12 is NO, that is, the rotors 13R and 13L are rotated in phase, the routine is returned. To the contrary, in case the answer of step S12 is YES, that is, the rotors 13R and 13L are rotated out of phase, positions of the magnetic fields to be generated in the stators 15R and 15L are determined based on the phases of the rotors 13R and 13L detected at step S11, and the phases of the rotors 13R and 13L are synchronized by the above-explained procedures (at step S13). Then, the routine is returned.

Next, a control example of the case in which the vehicle E is turning will be explained hereinafter. In case the vehicle E is turning, a speed of the inner wheel and a speed of the outer wheel are differentiated so that the in-wheel motors 2R and 2L are required to output different torques. In this situation, specifically, the speed of the outer wheel is higher than that of the inner wheel, and the in-wheel motor driving the outer wheel is thereby required to output a higher torque than the other one. Therefore, in case the switching device 16 switches the electrical connection in a manner to supply the current to both of the in-wheel motors 2R and 2L from one of the inverters 9R and 9L during the turning of the vehicle E, the in-wheel motor 2R or 2L of the outer wheel side outputs the positive torque to drive the outer wheel 1R or 1L, and the other in-wheel motor 2R or 2L of the inner wheel side outputs the negative torque to be idled.

An example of the above-explained control will be explained hereinafter. In case the rotor 13R is situated at the position shown in FIG. 7(a) and the rotor 13L is situated at the position shown in FIG. 7(b), the output torques of the rotors 13R and 13L are varied depending on the position of the magnetic field established in the stators 15R and 15L as indicated in FIGS. 8(A) and 8(B). For example, in case the switching device 16 switches the electrical connection in a manner to supply the current to both of the stators 15R and 15L from one of the inverters 9R and 9L under the condition in which the vehicle E is turning to the right, the magnetic field is established in the stator 15L at the position where the left in-wheel motor 2L is allowed to output the positive torque, and the magnetic field is established in the stator 15R at the position where the right in-wheel motor 2R is allowed to output the negative torque. Specifically, the left in-wheel motor 2L outputs the positive torque by establishing the magnetic field in the stator 15L within A range in FIG. 8(B), that is, within the clockwise range between 135 degrees and −135 degrees in FIG. 7(b). In this situation, to the contrary, the right in-wheel motor 2R outputs the negative torque by establishing the magnetic field in the stator 15R within A range in FIG. 8(A), that is, within the clockwise range between 135 degrees and −135 degrees in FIG. 7(a). Then, the position to establish the magnetic field in A range of the stator 15L is determined in accordance with the torque demand of the in-wheel motor 2L. Thus, directions of the output torques of the in-wheel motors 2R and 2L are changed depending on the turning direction, and the point to establish the magnetic field within the range in the stator 15R or 15L is determined according to the output torque demand. Specifically, provided that the vehicle E is turning to the right, in case the in-wheel motor 2L is required to generate a large torque, the magnetic field is established in the stator 15L at the point I shown in FIG. 8(B). To the contrary, in case the in-wheel motor 2L is required to generate a small torque, the magnetic field is established in the stator 15L at the point II shown in FIG. 8(B). Meanwhile, in case the vehicle is turning to the left, the magnetic field is established within C range in each of the stators 15R and 15L.

Figure 10:
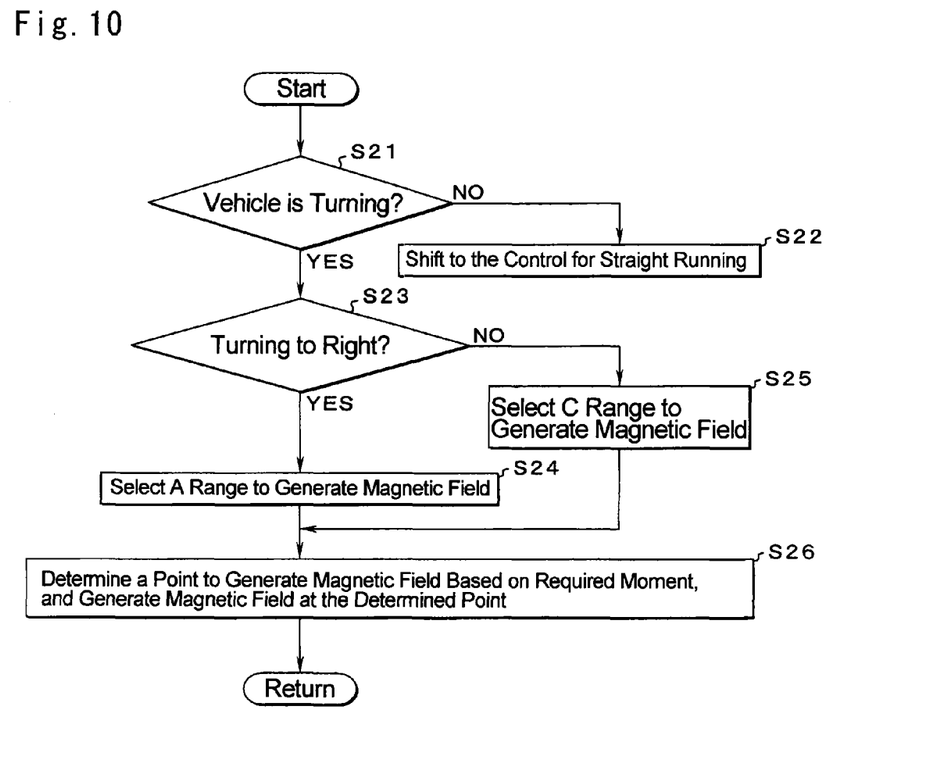
FIG. 10 is a flowchart explaining a control for the case in which the vehicle is turning.

FIG. 10 is a flowchart showing the above-explained control. First of all, it is judged whether or not the vehicle E is turning (at step S21). In case the answer of step S21 is NO, that is, in case the vehicle E is running straight ahead, the control is shifted to the above-explained control to be carried out under the condition in which the vehicle E is running straight ahead (at step S22). In this case, specifically, the phases of the rotors 13R and 13L are synchronized by establishing the magnetic field within B range in both of the stators 15R and 15L. To the contrary, in case the answer of step S21 is YES, that is, in case the vehicle E is turning, it is judged whether or not the vehicle E is turning to the right (at step S23). In case the answer of step S23 is YES, that is, in case the turning direction of the vehicle E is right, the A range is selected to establish the magnetic field in each of the stators 15R and 15L (at step S24). To the contrary, in case the answer of step S23 is NO, that is, in case the turning direction of the vehicle E is left, the C range is selected to establish the magnetic field in each of the stators 15R and 15L (at step S25). Then, the point to establish the magnetic field in the selected range of the stator 15R or 15L is determined based on the moment required to turn the vehicle E, and the magnetic field is established at the determined point (at step S26). Then, the routine is returned.

According to the above-explained control, therefore, the vehicle E is allowed to drive stably in line with the drive demand even if the in-wheel motors 2R and 2L are being rotated out of phase under the situation in which the current is supplied to both of the in-wheel motors 2R and 2L from only one of the inverters 9R and 9L.

The control system according to the present invention should not be limited to the configuration thus has been explained. For example, the one-way clutch 12 is used in the above-explained example so that the negative torque will not be transmitted to the front wheel 1. However, a positive clutch, a wet clutch, a dry clutch etc. may also be used instead of the one-way clutch. As described, according to the control system of the present invention, the in-wheel motors 2R and 2L output the torque in the direction opposite to the running direction of the vehicle thereby synchronizing the phases of the rotors 13R and 13L in case of supplying the current to both of the in-wheel motors 2R and 2L from only one of the inverters 9R and 9L. For this purpose, any kind of clutches adapted not to transmit the negative torque to the front wheel 1 may be used in the control system of the present invention. In addition, in the example thus far explained, only one pair of the magnetic poles in the rotor 13 has been explained for the purpose of simplifying the explanation. However, a rotor having a plurality of pairs of magnetic poles may also be used in the control system according to the present invention.

Here will be explained a relation between the above-explained example and the present invention. The in-wheel motors 2R and 2L correspond to the driving motor of the present invention, the inverters 9R and 9L correspond to the current control means of the present invention, and the switching device 16 corresponds to the switching means of the present invention. In addition, the above-explained situation in which "the in-wheel motors 2R or 2L outputs the torque in the direction opposite to the running direction of the vehicle" includes a situation in which the in-wheel motors 2R and 2L output the negative torques when the vehicle is running straight ahead, and a situation in which the in-wheel motor 2R or 2L of the inner wheel side outputs the negative torque when the vehicle is turning.

In case of using the friction clutch or the positive clutch, those clutches can be engaged selectively depending on the situation. Therefore, the above-explained situation in which "the in-wheel motors 2R or 2L outputs the torque in the direction opposite to the running direction of the vehicle" also includes a situation in which the in-wheel motors 2R and 2L output the positive torques.

In the above-explained example, the magnetic field is established in both of the stators 15R and 15L within the range where the in-wheel motors output the negative torques under the situation in which the vehicle is running straight ahead. However, in case of using the friction clutch or the positive clutch, the power will not be transmitted to the wheel by disengaging the clutch. That is, the torque will not be transmitted to the wheel by disengaging the clutch irrespective of the range to generate the magnetic field in the stator. In this case, therefore, the in-wheel motor(s) is allowed to output the positive torque by generating the magnetic field in the range possible to output the positive torque. Meanwhile, in case the vehicle is turning, the magnetic field is generated in the range to output the negative torque in the stator of the in-wheel motor situated in the inner wheel side, and the magnetic field is generated in the range to output the positive torque in the stator of the in-wheel motor situated in the outer wheel side. However, in case of using the friction clutch or the positive clutch, it is sufficient to generate the magnetic field in the range to output the positive torque only in the stator of the in-wheel motor situated in the outer wheel side to establish the output torque for driving the outer wheel. In addition, the power will not be transmitted to the wheel by disengaging the clutch, as described above. Therefore, in this case, the magnetic field may also be generated in the range of the stator of the in-wheel motor situated in the inner wheel side.

The invention claimed is:

1. A control system for driving motor, comprising:
    at least two driving motors individually connected with a wheel of a vehicle to drive the wheel;
    a clutch, which is interposed between each driving motors and the wheels to transmit a torque of the driving motor selectively to the wheel;
    at least two current control means connected individually with the driving motors to supply current thereto;
    a switching means that switches an electrical connection in a manner to supply the current to both of the driving motors from one of the current control means by interrupting the current supply from the other current control means; and
    wherein the clutch is adapted to interrupt torque transmission in case the switching means switches the electrical connection in a manner to supply the current to both of the driving motors from one of the current control means to drive the vehicle.

2. The control system for driving motor as claimed in claim 1,
    wherein the clutch interrupts the torque transmission in case of synchronizing rotor phases of the driving motors under the situation in which the switching means switches the electrical connection in a manner to supply the current to both of the driving motors from said one of the current control means.

3. The control system for driving motor as claimed in claim 1, wherein:
    in case the driving motors are demanded to output torques of different amplitude under the situation in which the switching means switches the electrical connection in a manner to supply the current to both of the driving motors from said one of the current control means, the clutch transmitting the smaller torque interrupts the torque transmission.

4. The control system for driving motor as claimed in claim 1,
    wherein the clutch includes a one-way clutch that transmits the torque only in one direction.

5. The control system for driving motor as claimed in claim 2, wherein:
    in case the driving motors are demanded to output torques of different amplitude under the situation in which the switching means switches the electrical connection in a manner to supply the current to both of the driving motors from said one of the current control means, the clutch transmitting the smaller torque interrupts the torque transmission.

6. The control system for driving motor as claimed in claim 2,
    wherein the clutch includes a one-way clutch that transmits the torque only in one direction.

7. The control system for driving motor as claimed in claim 3,
    wherein the clutch includes a one-way clutch that transmits the torque only in one direction.

8. The control system for driving motor as claimed in claim 5,
    wherein the clutch includes a one-way clutch that transmits the torque only in one direction.

9. A control system for driving motor, comprising:
    at least two driving motors individually connected with a wheel of a vehicle to drive the wheel;
    a clutch, which is interposed between each driving motors and the wheels to transmit a torque of the driving motor selectively to the wheel;
    at least two current control devices connected individually with the driving motors to supply current thereto;
    a switching device that switches an electrical connection in a manner to supply the current to both of the driving motors from one of the current control devices by interrupting the current supply from the other current control device; and
    wherein the clutch is adapted to interrupt torque transmission in case the switching device switches the electrical connection in a manner to supply the current to both of the driving motors from one of the current control devices to drive the vehicle.

* * * * *